US011630261B2

(12) United States Patent
Xie

(10) Patent No.: US 11,630,261 B2
(45) Date of Patent: Apr. 18, 2023

(54) CO-PACKAGED OPTICS SWITCH SOLUTION BASED ON ANALOG OPTICAL ENGINES

(71) Applicant: Alibaba Singapore Holding Private Limited, Singapore (SG)

(72) Inventor: Chongjin Xie, Morganville, NJ (US)

(73) Assignee: ALIBABA SINGAPORE HOLDING PRIVATE LIMITED, Singapore (SG)

( * ) Notice: Subject to any disclaimer, the term of this patent is extended or adjusted under 35 U.S.C. 154(b) by 37 days.

(21) Appl. No.: 17/244,611

(22) Filed: Apr. 29, 2021

(65) Prior Publication Data

US 2022/0350077 A1    Nov. 3, 2022

(51) Int. Cl.
*G02B 6/12* (2006.01)
*G02B 6/293* (2006.01)
*G02B 6/43* (2006.01)

(52) U.S. Cl.
CPC ..... *G02B 6/12004* (2013.01); *G02B 6/29379* (2013.01); *G02B 6/43* (2013.01)

(58) Field of Classification Search
CPC ... G02B 6/12004; G02B 6/29379; G02B 6/43
See application file for complete search history.

(56) References Cited

U.S. PATENT DOCUMENTS

| | | |
|---|---|---|
| 5,305,412 A | 4/1994 | Paoli |
| 6,016,219 A | 1/2000 | Fatehi |
| 6,175,560 B1 | 1/2001 | Bhagalia et al. |
| 6,266,168 B1 | 7/2001 | Denkin |
| 6,341,032 B1 | 1/2002 | Fukashiro |
| 6,433,922 B1 | 8/2002 | Ghera |
| 6,650,468 B1 | 11/2003 | Bryant |
| 6,754,420 B2 | 6/2004 | Tsuritani |
| 6,952,395 B1 | 10/2005 | Manoharan |
| 7,024,110 B2 | 4/2006 | Jasti |
| 7,123,404 B1 | 10/2006 | Mori |
| 7,136,583 B2 | 11/2006 | Oberg |
| 7,231,146 B2 | 6/2007 | Arecco |
| 7,400,829 B2 | 7/2008 | Watanabe |
| 7,756,422 B2 | 7/2010 | Sakamoto |
| 8,822,895 B2 | 9/2014 | Abedin |
| 9,712,239 B2 | 7/2017 | Murshid |
| 9,787,418 B2 | 10/2017 | Earl |
| 9,917,672 B2 | 3/2018 | Jensen |
| 10,230,464 B2 | 3/2019 | Yuan |
| 10,320,691 B1 | 6/2019 | Matthews |
| 10,908,369 B1 * | 2/2021 | Mahdi Hayder .... G02B 6/4206 |

(Continued)

FOREIGN PATENT DOCUMENTS

WO    2015128476    9/2015

*Primary Examiner* — Ellen E Kim
(74) *Attorney, Agent, or Firm* — Shun Yao; Yao Legal Services, Inc.

(57) ABSTRACT

One embodiment described herein provides a co-packaged optics (CPO) switch assembly. The CPO switch assembly includes a switch integrated circuit (IC) chip and a number of optical modules coupled to the switch IC chip. The switch IC chip and the optical modules are co-packaged within a same physical enclosure. The switch IC chip includes a switch logic and a digital signal processing (DSP) unit, and a respective optical module comprises: a photonic integrated chip (PIC), a first amplifier module, and a second amplifier module.

20 Claims, 8 Drawing Sheets

(56) References Cited

U.S. PATENT DOCUMENTS

| | | |
|---|---|---|
| 11,336,376 B1 * | 5/2022 | Xie ..................... H04B 10/572 |
| 2001/0021045 A1 | 9/2001 | Tervonen |
| 2002/0154353 A1 | 10/2002 | Heath |
| 2002/0191904 A1 | 12/2002 | Kani |
| 2004/0037555 A1 | 2/2004 | Evangelides |
| 2004/0047371 A1 | 3/2004 | Lentine |
| 2004/0090662 A1 | 5/2004 | Bang |
| 2004/0114925 A1 | 6/2004 | Berthold |
| 2004/0146305 A1 | 7/2004 | Neubelt |
| 2004/0175187 A1 | 9/2004 | Eiselt |
| 2004/0208506 A1 | 10/2004 | Kinoshita |
| 2004/0213577 A1 | 10/2004 | Sugahara |
| 2005/0025486 A1 | 2/2005 | Zhong |
| 2005/0047781 A1 | 3/2005 | El-Reedy |
| 2005/0074236 A1 | 4/2005 | Urimindi |
| 2005/0078601 A1 | 4/2005 | Moll |
| 2005/0110980 A1 | 5/2005 | Maehara |
| 2006/0067346 A1 | 3/2006 | Tucker |
| 2006/0087975 A1 | 4/2006 | Zheng |
| 2006/0115266 A1 | 6/2006 | Levi |
| 2006/0165079 A1 | 7/2006 | Rodrigo |
| 2006/0176545 A1 | 8/2006 | Nakamura |
| 2008/0008183 A1 | 1/2008 | Takagaki |
| 2009/0028562 A1 | 1/2009 | Gianordoli |
| 2009/0067843 A1 | 3/2009 | Way |
| 2009/0103915 A1 | 4/2009 | Aprile |
| 2009/0226174 A1 | 9/2009 | Csupor |
| 2009/0245786 A1 | 10/2009 | Sakamoto |
| 2009/0262790 A1 | 10/2009 | Molotchko |
| 2009/0290837 A1 | 11/2009 | Chen |
| 2010/0091355 A1 | 4/2010 | Ota |
| 2010/0124421 A1 | 5/2010 | Chand |
| 2010/0284687 A1 | 11/2010 | Tanzi |
| 2010/0290780 A1 | 11/2010 | Teipen |
| 2010/0296808 A1 | 11/2010 | Hinderthuer |
| 2011/0116786 A1 | 5/2011 | Wellbrock |
| 2011/0126005 A1 | 5/2011 | Carpenter |
| 2011/0274435 A1 | 11/2011 | Fini |
| 2012/0020672 A1 | 1/2012 | Aguren |
| 2012/0033966 A1 | 2/2012 | Rosenbluth |
| 2012/0078708 A1 | 3/2012 | Taylor |
| 2012/0106971 A1 | 5/2012 | Sugaya |
| 2012/0281950 A1 | 11/2012 | Fattal |
| 2012/0294604 A1 | 11/2012 | Roberts |
| 2013/0189856 A1 | 7/2013 | Ko |
| 2013/0223484 A1 | 8/2013 | Tang |
| 2013/0236175 A1 | 9/2013 | Sethumadhavan |
| 2013/0243438 A1 | 9/2013 | Tang |
| 2013/0272694 A1 | 10/2013 | Sandstrom |
| 2013/0343757 A1 | 12/2013 | Wigley |
| 2014/0013402 A1 | 1/2014 | Bugenhagen |
| 2014/0029941 A1 | 1/2014 | Bratkovski |
| 2014/0105592 A1 | 4/2014 | Kataria |
| 2014/0153922 A1 | 6/2014 | Ryf |
| 2014/0186021 A1 | 7/2014 | Striegler |
| 2014/0199065 A1 | 7/2014 | Bratkovski |
| 2014/0205286 A1 | 7/2014 | Ji |
| 2014/0248059 A1 | 9/2014 | Tang |
| 2014/0258772 A1 | 9/2014 | Kataria |
| 2014/0286648 A1 | 9/2014 | Buelow |
| 2014/0307304 A1 | 10/2014 | Zhu |
| 2014/0363171 A1 | 12/2014 | Tang |
| 2015/0249501 A1 * | 9/2015 | Nagarajan ............... H04B 10/40 |
| | | 398/79 |
| 2015/0296279 A1 | 10/2015 | Bouda |
| 2015/0341123 A1 | 11/2015 | Nagarajan |
| 2015/0382088 A1 | 12/2015 | Braun |
| 2016/0056889 A1 | 2/2016 | Le Taillandier De Gabory |
| 2016/0233959 A1 | 8/2016 | Murshid |
| 2016/0277101 A1 | 9/2016 | Jiang |
| 2016/0306115 A1 | 10/2016 | Koonen |
| 2017/0155466 A1 | 6/2017 | Zhou |
| 2017/0192182 A1 | 7/2017 | Peterson |
| 2017/0214463 A1 | 7/2017 | Milione |
| 2017/0299900 A1 | 10/2017 | Montoya |
| 2017/0343750 A1 | 11/2017 | Ashrafi |
| 2017/0353242 A1 | 12/2017 | Mansouri Rad |
| 2017/0353265 A1 | 12/2017 | Mansouri Rad |
| 2018/0048494 A1 * | 2/2018 | Mobin .............. H04L 25/03885 |
| 2019/0190615 A1 * | 6/2019 | Xue .................... H01S 5/06837 |
| 2021/0044356 A1 * | 2/2021 | Aboagye .............. G02B 6/4256 |
| 2022/0187559 A1 * | 6/2022 | Lin ..................... G02B 6/3897 |

* cited by examiner

CO-PACKAGED OPTICS SWITCH SOLUTION BASED ON ANALOG OPTICAL ENGINES

BACKGROUND

Field

This disclosure is generally related to optical switches based on co-packaged optics (CPO) technology. More specifically, this disclosure is related to a CPO switch that implements analog optical engines.

Related Art

Since the beginning of this century, the increasing demand of the Internet and cloud computing services has caused datacenter traffic to double every one or two years, presenting a big challenge to datacenter networks. To meet the demand of such fast traffic growth, the speed of datacenter networks has evolved quickly. Such rapid evolvement is supported, at least in part, by the rapid development in optical transceiver technologies. New transceiver solutions emerge every three to four years with increasing speed. Optical transceivers operating at a data rate of 100 Gbps have been widely deployed in datacenters, and optical transceivers operating at 400 Gbps are starting to be deployed. It is anticipated that the speed of next-generation transceivers can reach beyond 1 Tbps in the next few years. How to continuously increase the speed of optical transceiver modules to meet the increasing bandwidth demand of cloud computing and big data while maintaining the cost, power consumption, and size of those modules manageably is a key to the continuous development of high-speed optical interconnect technology.

Newly emerged co-packaged optics (CPO) technology allows optical modules to be co-packaged with the switch application-specific integrated circuit (ASIC), thus significantly reducing the length of the switch-optic interconnects and lowering the power consumption of the switch-optic electrical I/O. Switches based on the CPO technology can offer a low-power and low-cost alternative to pluggable optical transceivers in mega datacenters. Packaging the high-speed electrical component (i.e., the switch ASIC) and a number of high-speed optical components (e.g., silicon photonic chips) together can be challenging.

SUMMARY

One embodiment described herein provides a co-packaged optics (CPO) switch assembly. The CPO switch assembly includes a switch integrated circuit (IC) chip and a number of optical modules coupled to the switch IC chip. The switch IC chip and the optical modules are co-packaged within a same physical enclosure. The switch IC chip includes a switch logic and a digital signal processing (DSP) unit, and a respective optical module comprises: a photonic integrated chip (PIC), a first amplifier module, and a second amplifier module.

In a variation on this embodiment, the co-packaged optics (CPO) switch assembly can further include a micro-controller unit (MCU) coupled to the switch IC chip and the optical module. The micro-controller is external to the optical module and is configured to set operating parameters of components within the DSP unit and the optical module.

In a further variation, the MCU is configured to: optimize operating parameters of a component within the optical module based on output signals of the DSP unit; and optimize operating parameters of a component within the DSP unit based on output signals of the optical module.

In a variation on this embodiment, the DSP unit comprises one or more digital equalizers for equalizing signals transmitted to and/or received from the optical module.

In a further variation, the digital equalizers comprise one or more of: a feed-forward equalizer (FFE), a decision-feedback equalizer (DFE), a maximum-likelihood sequence estimation (MLSE) equalizer, and a reflection canceller.

In a variation on this embodiment, the optical module further comprises a continuous-time linear equalizer (CTLE) for equalizing an analog signal received by the optical module and/or a pre-emphasis equalizer for equalizing an analog signal transmitted by the optical module.

In a variation on this embodiment, the PIC comprises a set of optical modulators for transmitting optical signals and a set of photodetectors for receiving optical signals.

In a further variation, the first amplifier module comprises a set of modulator drivers respectively coupled to the modulators, and the second amplifier module comprises a set of transimpedance amplifiers (TIAs) respectively coupled to the photodetectors.

In a variation on this embodiment, the switch IC chip further comprises a digital-to-analog converter (DAC) configured to convert digital signals outputted by the switch logic to analog domain and an analog-to-digital converter (ADC) configured to convert analog signals received from an optical module to digital domain.

One embodiment provides a switch integrated circuit (IC) chip to be co-packaged with a plurality of optical modules to form a CPO switch assembly. The switch IC chip includes a switch logic and a digital signal processing (DSP) unit comprising one or more digital equalizers for equalizing signals transmitted to and/or received from the optical module.

In a variation on this embodiment, the digital equalizers comprise one or more of: a feed-forward equalizer (FFE), a decision-feedback equalizer (DFE), a maximum-likelihood sequence estimation (MLSE) equalizer, and a reflection canceller.

In a variation on this embodiment, the switch IC chip further comprises a digital-to-analog converter (DAC) configured to convert digital signals outputted by the switch logic to analog domain and an analog-to-digital converter (ADC) configured to convert analog signals received from an optical module to digital domain.

In a variation on this embodiment, the switch IC chip is coupled to a micro-controller unit (MCU) configured to set operating parameters of the digital equalizers.

In a further variation, the MCU is configured to optimize the operating parameters of the digital equalizers based on output signals of the optical modules.

One embodiment provides an optical module to be co-packaged with a switch integrated circuit (IC) chip to form a CPO switch assembly. The optical module comprises a photonic integrated chip (PIC), a first amplifier module, and a second amplifier module.

In a variation on this embodiment, the optical module further comprises a continuous-time linear equalizer (CTLE) for equalizing an analog signal received by the optical module and/or a pre-emphasis equalizer for equalizing an analog signal transmitted by the optical module.

In a variation on this embodiment, the PIC comprises a set of optical modulators for transmitting optical signals and a set of photodetectors for receiving optical signals.

In a further variation, the first amplifier module comprises a set of modulator drivers respectively coupled to the modulators, and the second amplifier module comprises a set of transimpedance amplifiers (TIAs) respectively coupled to the photodetectors.

In a variation on this embodiment, the optical module is coupled to a micro-controller unit (MCU) configured to set operating parameters of the amplifiers.

In a further variation, the MCU is configured to optimize the operating parameters of the amplifiers based on output signals of a digital signal processing (DSP) unit located within the switch IC chip.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

The disclosed embodiments provide a co-packaged optics switch chip (CPOSC) that implements analog optical engines. More specifically, by placing digital logics for signal compensation outside of the optical engines, one can obtain analog optical engines with characteristics that can be measured and verified independent of the digital logics. Moreover, the digital logics (e.g., a digital signal processor (DSP)) can be placed inside the integrated switch chip. The combination of the analog optical engines and the DSP inside the switch chip can simplify the design of the DSP and lower power consumption. Additional improvement to the performance of the optical engine can include adding analog equalizers to further compensate for signal distortions resulting from the packaging of the switch chip and the optical module.

Analog Optical Engine

Figure 1A:
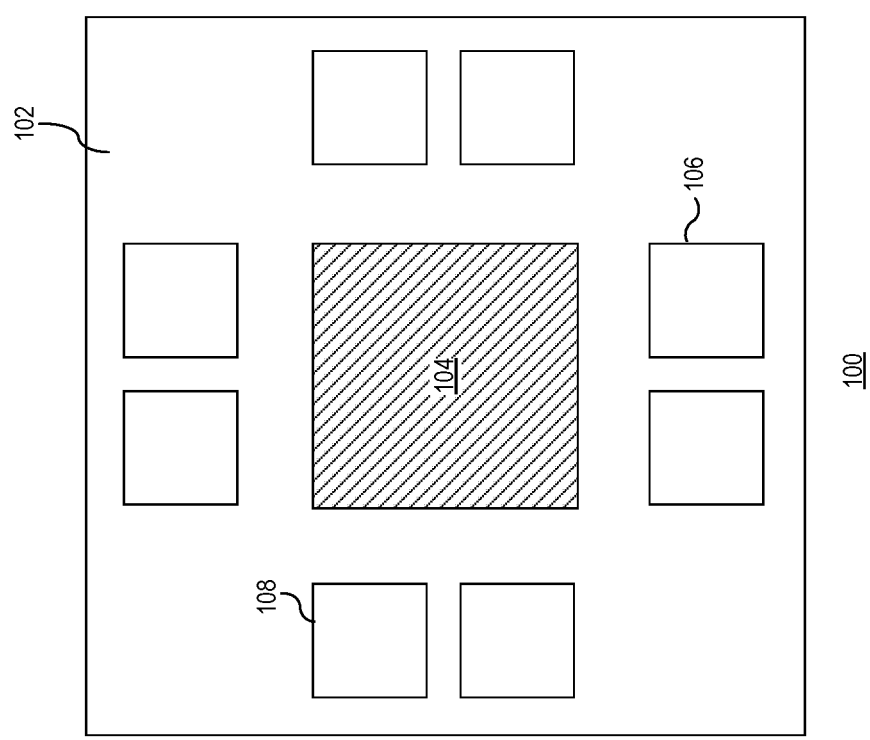
FIG. 1A illustrates an exemplary co-packaged optics (CPO) switch assembly.

FIG. 1A illustrates an exemplary co-packaged optics (CPO) switch assembly. CPO switch assembly 100 can include a packaging substrate 102, a switch integrated circuit (IC) module 104 situated on top of packaging substrate 102, and a number of optical engines (e.g., optical engines 106 and 108) around the perimeter of packaging substrate 102, surrounding switch IC module 104.

Packaging substrate 102 can be a high-density organic substrate with a dimension between 100×100 mm$^2$ and 150×150 mm$^2$. Switch IC module 104 can include a monolithic IC chip or multiple chips functioning as a single switch. Optical engines in a CPO switch assembly are also referred to as optical engines as they are responsible for receiving and transmitting optical signals. In the example shown in FIG. 1, there are eight optical engines in CPO switch assembly 100. In practice, a CPO switch assembly 100 can include more or fewer optical engines, depending on the speed of each module and the speed of switch IC module 104. In one embodiment, each optical module can operate at 32×100 Gbps and switch IC module 104 can operate at 25.6 Tbps. Other combinations are also possible. For example, switch IC module 104 can operate at 51.2 Tbps and CPO switch assembly 100 can include 64 optical engines, each operating at a speed of 800 Gbps. The interface between the optical engines and switch IC module 104 can be high-speed SERDES. As one can see, compared with conventional solutions where the switching IC module and the optical engines are packaged separately, the length of the high-speed SERDES links between the optical engines and switch IC module 104 can be much shorter, thus significantly reducing the amount of power consumption.

Figure 1B:
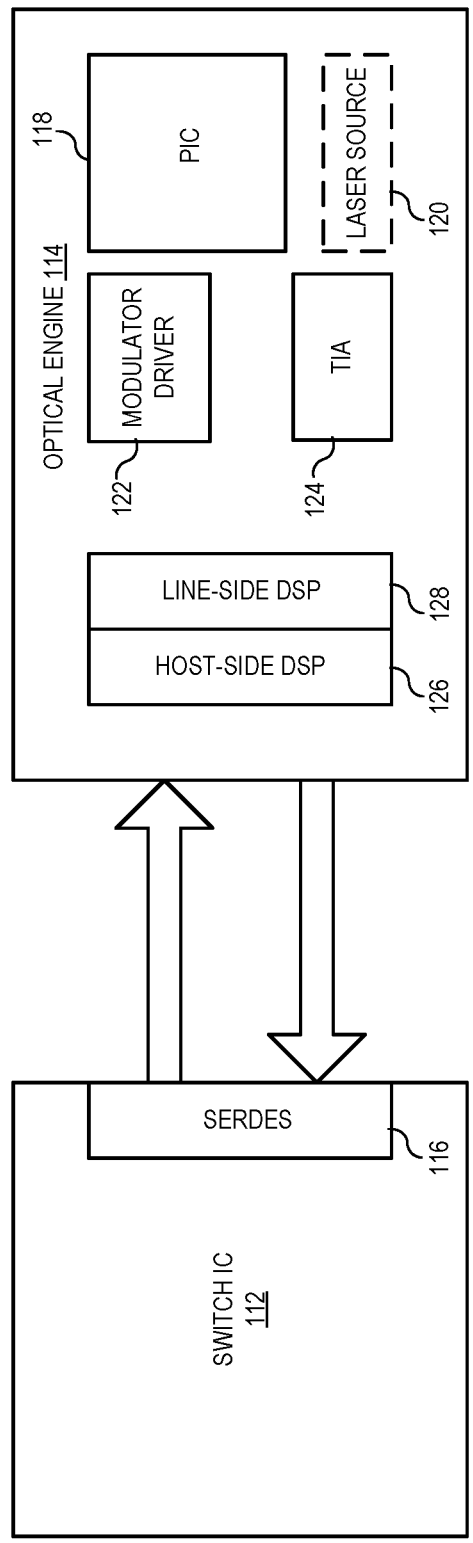
FIG. 1B illustrates the internal structure of a switch IC module and optical engine, according to prior art.

FIG. 1B illustrates the internal structure of a switch IC module and optical engine, according to prior art. In FIG. 1B, switch IC chip 112 interfaces with optical engine 114 via a high-speed SERDES interface 116. Optical engine 114 includes a number of optical and electrical components, including a photonic integrated chip (PIC) 118 that includes optical modulators and photodetectors, an optional laser source 120, a modulator driver module 122, and a transimpedance amplifier (TIA) module 124. Laser source 120 is optional because it can be external to optical engine 114 or even external to the CPO switch assembly. In addition, optical engine 114 can include one or more digital signal processors (DSPs) that perform signal equalization to compensate for the distortion of signals. In the example shown in FIG. 1A, optical engine 114 can include a host-side DSP 126 that can be used to compensate for the signal distortion due to the high-speed SERDES link between switch IC chip 112 and optical engine 114. In addition, optical engine 114 can also include a line-side DSP 128 that can be used to compensate for the signal distortion due to the various components within optical engine 114 (e.g., modulator driver module 122 and TIA module 124).

As one can see from FIG. 1B, the internal structure of the optical engine is very similar to that of conventional pluggable optical transceiver modules, meaning that little improvement is made to the power consumption and cost of the optical engine. Moreover, because the optical engine includes both digital components (e.g., the DSPs) and analog components (e.g., modulators and their drivers, TIAs, photodetectors, etc.), which are often provided by different vendors, testing and verification of the characteristics of the optical engine can be cumbersome. More particularly, the vendor for those analog components cannot test or verify the characteristics of their products independently without the DSPs, thus creating obstacles in the development and manufacture of the products. To overcome these obstacles and to reduce cost and power consumption, in some embodiments, a new type of optical engine (referred to as an analog optical engine) can be implemented in the CPO switch assembly.

Figure 2:
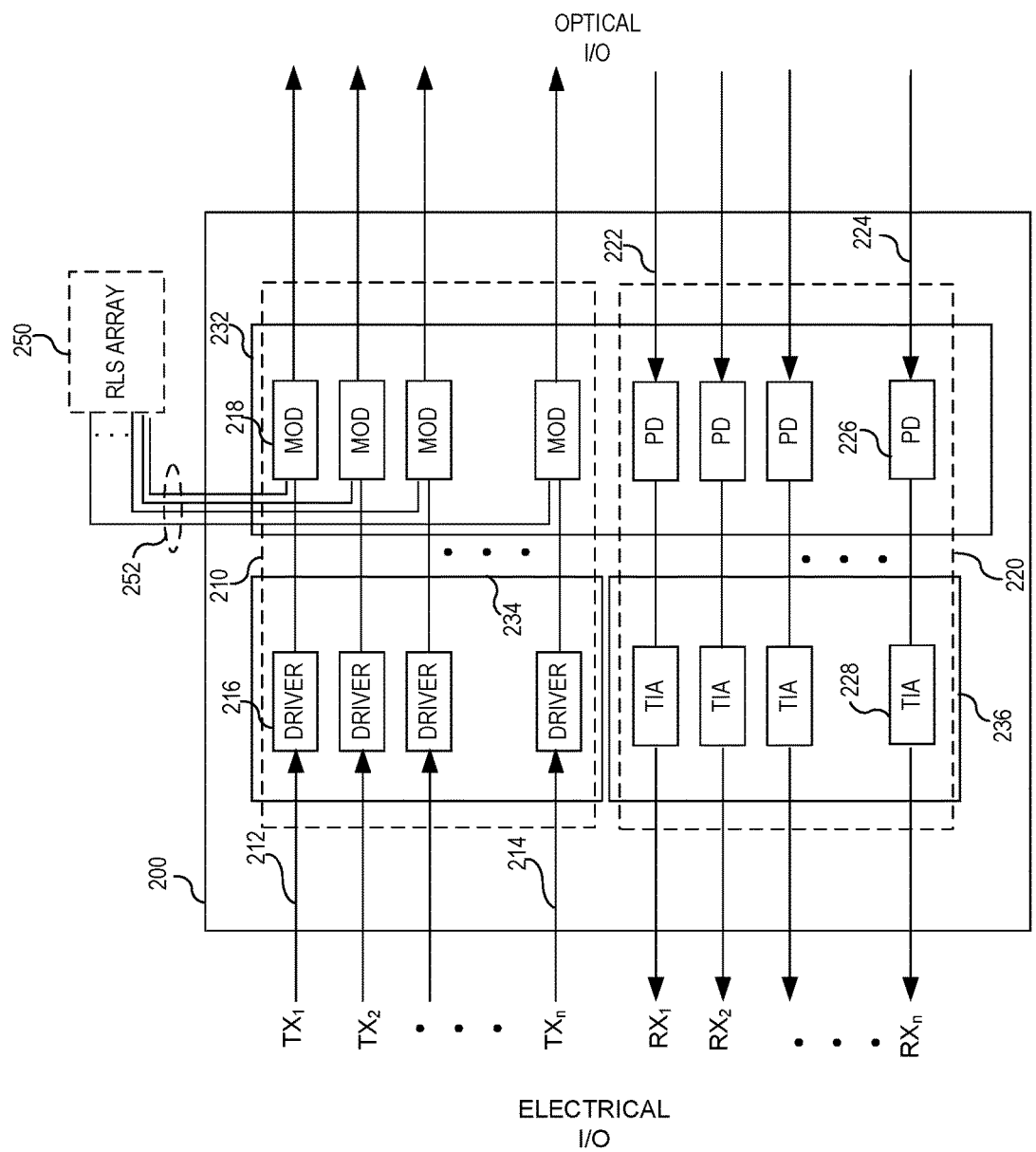
FIG. 2 presents an exemplary analog optical engine inside the CPO switch assembly, according to one embodiment.

FIG. 2 presents an exemplary analog optical engine inside the CPO switch assembly, according to one embodiment. Analog optical engine 200 can include a transmitter array 210 and a receiver array 220.

Transmitter array 210 can include a number of transmitting paths (e.g., transmitting paths 212 and 214), with each path including a modulator driver and an optical modulator. For example, transmitting path 212 includes driver 216 and modulator 218. In FIG. 2, the modulators are shown to be coupled to a remote laser source (RLS) array 250 (which is not part of optical engine 200 and can include a plurality of laser sources) via a number of optical paths, such as optical paths 252. In alternative embodiments, optical engine 200 can include an array of internal lasers (not shown in FIG. 2) as a light source.

Receiver array 220 can include a number of receiving paths (e.g., receiving paths 222 and 224), with each path including a photodetector and an amplifier (e.g., a TIA). In the example shown in FIG. 2, receiving path 224 includes PD 226 and TIA 228. Each transmitting/receiving path corresponds to an optical channel, which can be a wavelength channel or a spatial channel.

Note that, although in FIG. 2 transmitter array 210 and receiver array 220 are each placed in a dashed box, in reality, the various components can be integrated onto different dies. For example, the modulators and the photodetectors can be integrated onto a same PIC, as indicated by solid box 232. The PIC can be based on an InP or Si substrate. On the other hand, the modulator drivers can be integrated onto a single electrical chip (e.g., Si- or Ge-based), as indicated by solid box 234. Similarly, the TIAs can also be integrated onto a single Si- or Ge-based electrical chip, as indicated by solid box 236. Separating the received signal and the to-be-transmitted signal can reduce crosstalk.

As one can see from FIG. 2, optical engine 200 only includes modules that are dealing with analog signals. Hence, optical engine 200 can be referred to as an analog optical engine or module. Moreover, the various analog components in analog optical engine 200 are mostly likely to be from the same vendor, and before these components are packaged together, the vendor can test and verify their characteristics to ensure that they function properly as part of the optical engine. There is no longer the need to test these components along with the digital components (e.g., the DSPs).

In FIG. 2, analog optical engine 200 includes an optical input/output (I/O) interface (shown in FIG. 2 as on the right side of analog optical engine 200) for transmitting and receiving optical signals and an electrical I/O interface (shown in FIG. 2 as on the left side of analog optical engine 200) for transmitting and receiving electrical signals. Different from conventional optical engines, the electrical signals transmitted and received by analog optical engine 200 are analog signals that can be compensated for by digital equalizers located in the switch IC chip coupled to analog optical engine 200.

Figure 3:
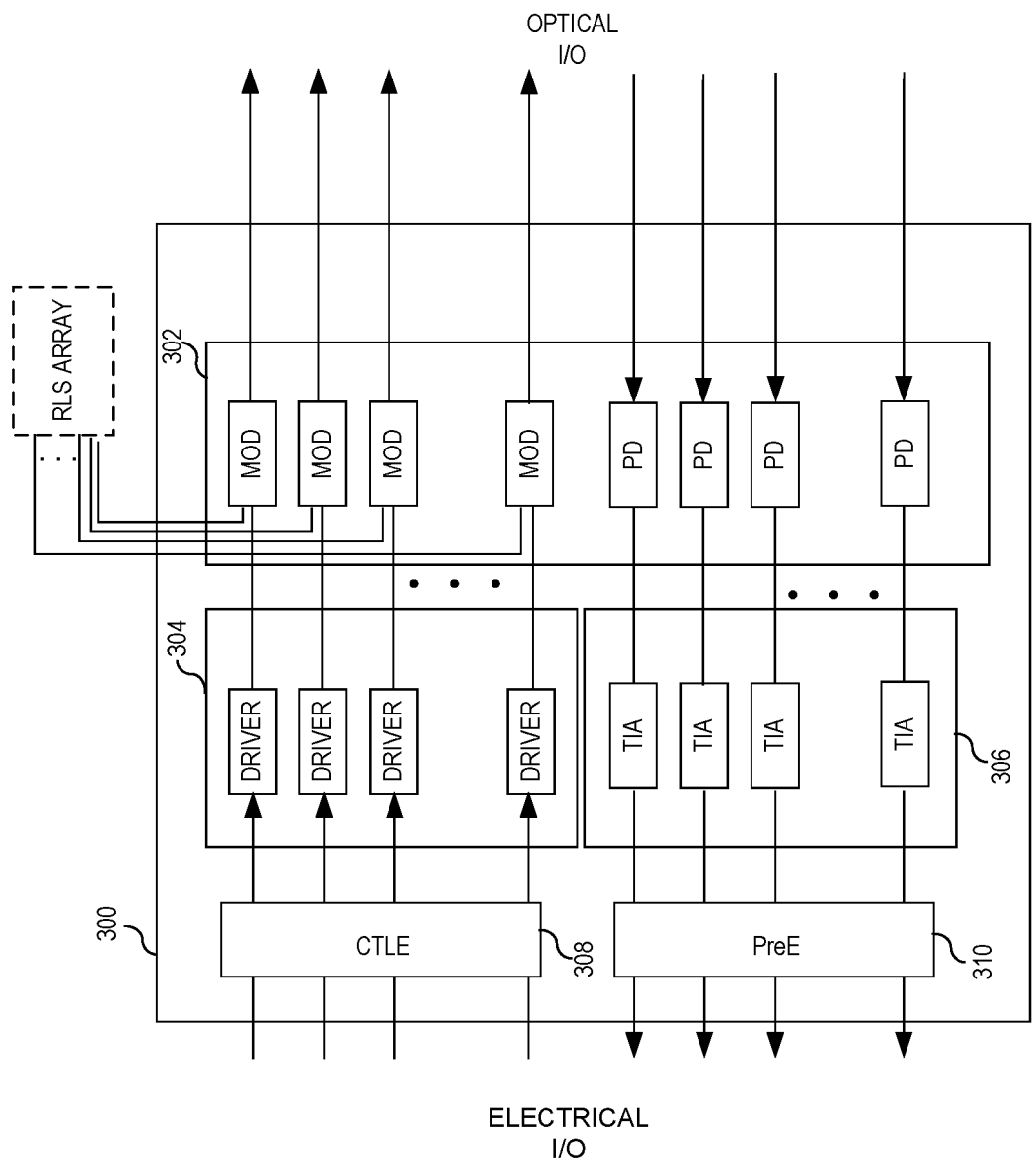
FIG. 3 presents an exemplary analog optical engine inside the CPO switch assembly, according to one embodiment.

In alternative embodiments, the analog optical engine can also include equalizers, which can also be analog components, to compensate for possible signal distortions. FIG. 3 presents an exemplary analog optical engine inside the CPO switch assembly, according to one embodiment. Similar to analog optical engine 200 shown in FIG. 2, analog optical engine 300 includes basic optical transceiver functioning blocks, such as a PIC 302, a modulator driver block 304, and an amplifier block 306.

PIC 302 can be a monolithically integrated photonic chip based on a semiconductor substrate (e.g., an InP or Si substrate). PIC 302 includes the optical components for different channels and for both the transmitting and receiving directions. More specifically, PIC 302 can include optical modulators and photodetectors. Modular driver block 304 includes the modulator drivers for the different transmitting channels, and amplifier block 306 includes amplifiers (e.g., TIAs) for the different receiving channels.

In addition, analog optical engine 300 includes a continuous-time linear equalizer (CTLE) 308 and a pre-emphasis equalizer (PreE) 310. CTLE 308 is an analog equalizer that is designed to counteract the effects of the channel's transfer function and has the advantage of being compact and low power. For example, the package of the switch ASIC and the transmission of the signals from the switch IC to analog optical engine can cause distortions of the signals, and CTLE 308 can be configured to compensate for such distortions. PreE 310 is also an analog equalizer and it is designed to compensate for high-frequency losses before the signal is transmitted. In FIG. 3, PreE 310 is applied to amplified receiver signals before they are sent to the switch ASIC.

During the operation of the switch, in the transmitter direction, the switch output (which is an electrical signal) can be received and optionally compensated for (e.g., by the CTLE) before being amplified by the modulator drivers. The amplified electrical signal then drives the corresponding modulators that modulate the CW optical signals received from the light source (e.g., the RLS array). The outputs of the modulators are optical signals transmitted via optical fibers coupled to the optical engine. In the receiving direction, the photodetectors convert the received optical signals to electrical signals, and the TIAs amplify these electrical signals, which can be optionally compensated for (e.g., by the PreE) before being sent to the switch chip.

Switch ASIC With Equalizers

In the example shown in FIG. 2, the analog optical engine does not include any equalizer, and in the example shown in FIG. 3, only analog equalizers are included in the analog optical engine. Compared with widely used digital equalization techniques (e.g., DSP-based equalization techniques), analog equalizers may be limited in their capability for compensating for signal distortions. To ensure that distortion to the signals resulting from the imperfection of the various components within the optical engine (e.g., the PIC, the drivers, the amplifiers, and the optical transmission fibers) can be sufficiently compensated for, in some embodiments, a DSP-based equalizer module can be included in the switch ASIC.

Figure 4:
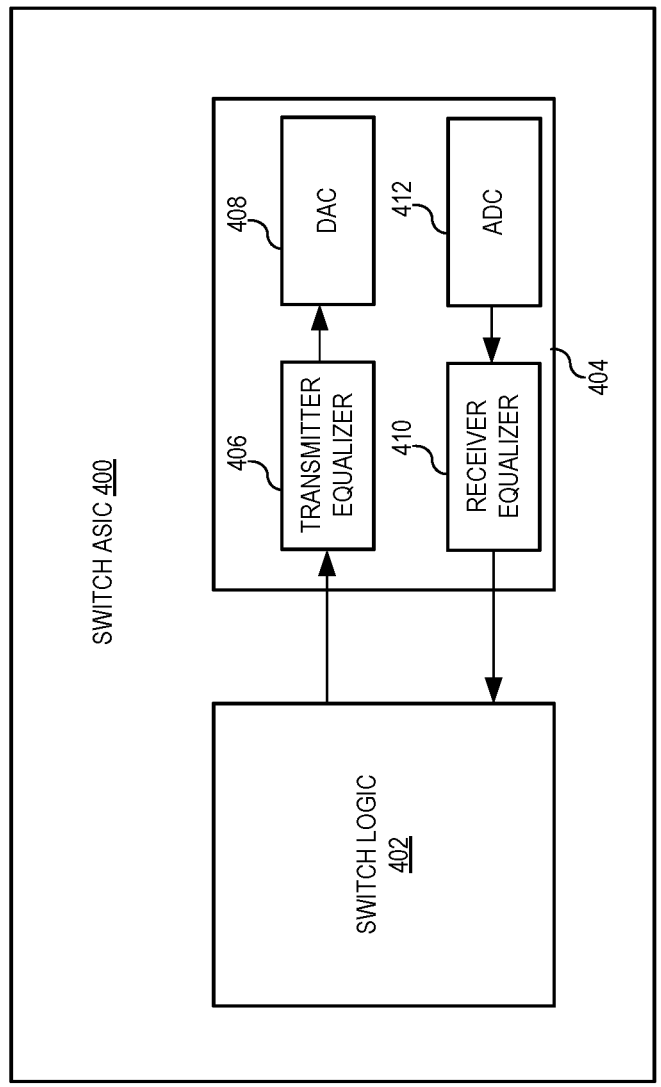
FIG. 4 presents a diagram illustrating an exemplary switch chip in the CPO-based switch assembly, according to one embodiment.

FIG. 4 presents a diagram illustrating an exemplary switch chip in the CPO-based switch assembly, according to one embodiment. In FIG. 4, switch ASIC 400 can include a switch logic 402 and a DSP module 404. Switch logic 402 can be responsible for performing the standard switch functions. DSP module 404 can include equalization function blocks that are responsible for compensating for the channel impairment. Note that, in the conventional solution shown in FIG. 1B, two separate DSP modules are included in the optical engine, with one DSP module being the host-side DSP and the other DSP module being the line-side DSP. The host-side DSP can implement an equalizer configured to compensate for the signal distortions resulting from the high-speed link between the switch ASIC and the optical engine, whereas the line-side DSP can implement another equalizer configured to compensate for the signal distortions resulting from the impairment of the various optical and electrical modules. Because DSP module 404 is located within switch ASIC 400, it is no longer necessary to include the host-side DSP in DSP module 404, thus significantly reducing the complexity of DSP module 404. Hence, DSP module 404 can also be simply referred to as the line-side DSP. The reduction in complexity of DSP module 404 not only can reduce the overall size but also the power consumption. For example, the amount of power consumption can be reduced by 20-30% compared with the case when both the host-side DSP and line-side DSP are needed for signal distortion compensation.

Also note that, in the conventional solution shown in FIG. 1B, the switch IC chip includes a high-speed SERDES module that is used to match the data rate of the switch to that of the optical engine. However, when switch ASIC 400 includes DSP module 404, the serializing and deserializing functions can now be performed by DSP module 404. In other words, DSP module 404 handles the SERDES function as well as the equalization function. More specifically, DSP module 404 can include a transmitter equalizer 406, a digital-to-analog converter (DAC) module 408, a receiver equalizer 410, and an analog-to-digital converter (ADC) module 412.

In some embodiments, transmitter equalizer 406 can include a feed-forward equalizer (FFE). Other types of equalizer can also be included in transmitter equalizer 406. Compared with relatively simpler transmitter equalizer 406, receiver equalizer 410 needs to compensate for the impairment of the photodetectors and the TIAs and often requires a more complex design. In some embodiments, receiver equalizer 410 can include one or more of: an FFE, a decision-feedback equalizer (DFE), a maximum-likelihood sequence estimation (MLSE) equalizer, a reflection canceller, etc.

During operation, the digital output of switch logic 402 can be compensated for by transmitter equalizer 406 before being converted to the analog domain by DAC module 408. The analog signal can then be sent to an analog optical engine coupled to switch ASIC 400. Similarly, analog signals received from the optical engine are first converted to the digital domain before being compensated for by receiver equalizer 410. The compensated digital signals are then sent to switch logic 402, which performs corresponding switching operations.

CPO Switch Assembly

Figure 5:
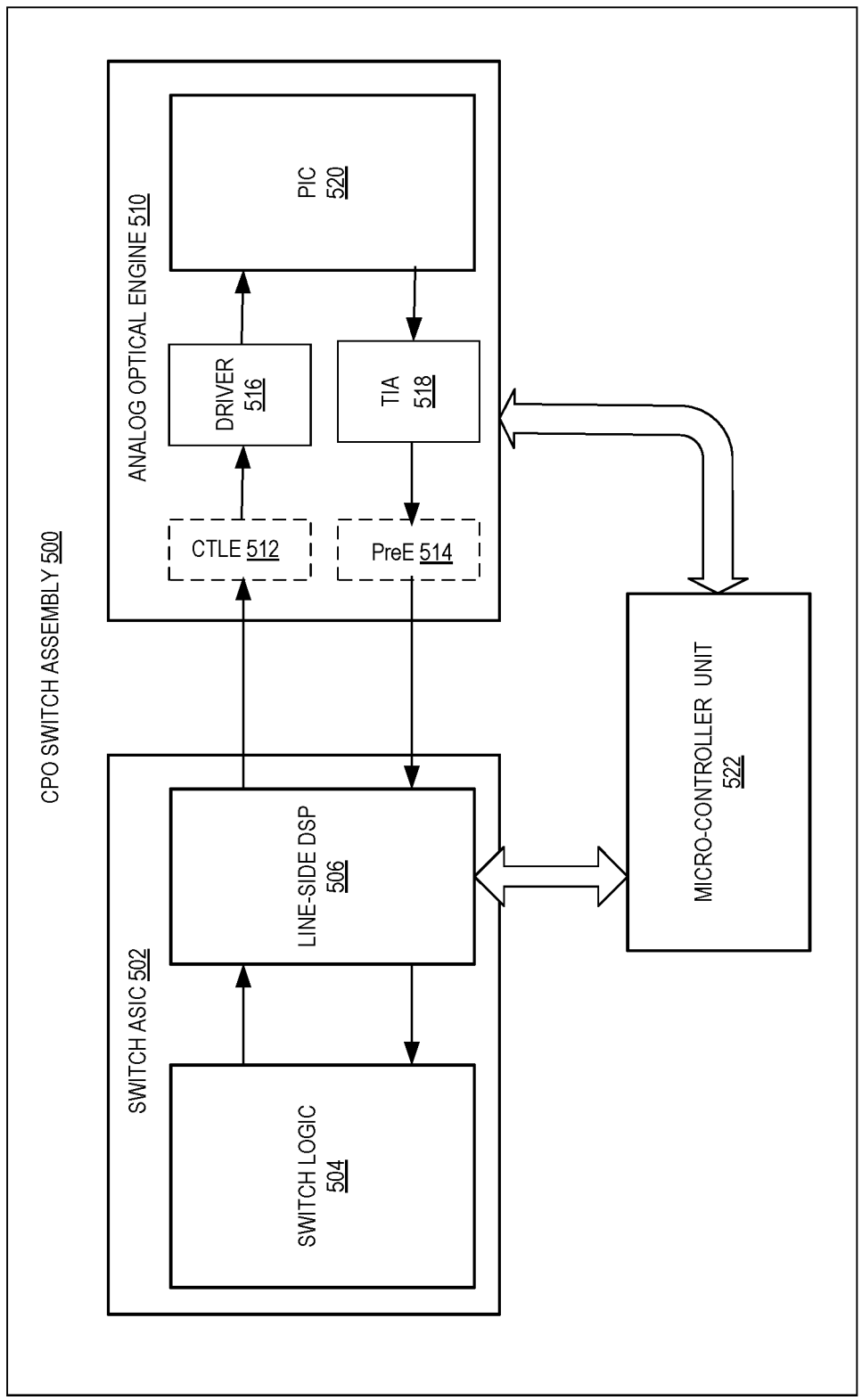
FIG. 5 illustrates an exemplary CPO switch assembly, according to one embodiment.

FIG. 5 illustrates an exemplary CPO switch assembly, according to one embodiment. CPO switch assembly 500 includes a switch ASIC 502, an analog optical engine 510, and a micro-controller unit (MCU) 522. More specifically, switch ASIC 502, analog optical engine 510, and MCU 522 are co-packaged within a same physical enclosure. In one embodiment, switch ASIC 502, analog optical engine 510, and MCU 522 can share a same packaging substrate.

Switch ASIC 502 can be similar to switch ASIC 400 shown in FIG. 4 and can include a switch logic 504 and a line-side DSP 506. As discussed before, switch logic 504 can be responsible for performing the switch functionalities, and line-side DSP 506 can include a number of function blocks that perform various functionalities, including equalization, serializing/deserializing, and conversion between analog and digital signals. More specifically, line-side DSP 506 provides an interface between analog optical engine 510 (which only deals with analog signals) and switch logic 504 (which only deals with digital signals). The internal structure of line-side DSP 506 can be similar to DSP module 404 shown in FIG. 4 and can include the transmitter equalizer, the receiver equalizer, the DAC, and the ADC. The speed of each ADC/DAC channel can be configured to match that of the optical channels of the optical engines.

Analog optical engine 510 can be similar to optical engine 300 shown in FIG. 3. More specifically, analog optical engine 510 can include an optional CTLE module 512, an optional PreE module 514, a modulator driver array 516, a TIA array 518, and a PIC 520 that includes an optical modulator array and a photodetector array. CTLE module 512 and PreE module 514 are analog equalizers, and they are optional because line-side DSP 506 included in switch ASIC 502 can include function blocks that act as digital equalizers. The number and speed of modulator drivers in modulator driver array 516 and the number and speed of amplifiers in TIA array 518 depend on the number and speed of optical channels in analog optical engine 510. For example, analog optical engine 510 can operate at a total speed of 8×100 Gbps, meaning that it supports eight optical channels with each channel operating at a speed of 100 Gbps. Accordingly, modulator driver array 516 can include eight modulator drivers and TIA array 518 can include eight amplifiers. The number and speed of modulators and photodetectors in PIC 520 can be similarly determined.

In the example shown in FIG. 5, switch ASIC 502 is shown to be coupled to a single analog optical engine. In practice, switch ASIC 502 can be coupled to a plurality of optical engines, and the total bandwidth of the optical engines can match the bandwidth of switch ASIC 502. For example, switch ASIC 502 can operate at 51.2 Tbps and can be coupled to 64 analog optical engines, with each analog optical engine operating at a speed of 800 Gbps. Alternatively, there can be 32 optical engines each operating at a speed of 1.6 Tbps.

Compared with conventional CPO switch assemblies, in FIG. 5, CPO switch assembly 500 includes an MCU 522 that is separate from and external to switch ASIC 502 and analog optical engine 510. MCU 522 can be part of the management and control platform of CPO switch assembly 500 and plays an important role during the calibration and optimization of CPO switch assembly 500. MCU 522 can use feedback signals from analog optical engine 510 to set parameters of various components within analog optical engine 510. For example, MCU 522 can set the amplifier gains (e.g., the gains of the modulator driver 516 and TIA 518) and the bias current/voltage of the optical modulators located within PIC 520 based on outputs of analog optical engine 510. Similarly, MCU 522 can use feedback signals from line-side DSP 506 to set parameters of components within line-side DSP 506. For example, MCU 522 can also optimize the parameters of the equalizers in line-side DSP 506 based on output signals of line-side DSP 506.

In conventional solutions, the management and control module (e.g., an MCU) is typically located within the optical engine and is used to optimize the operating parameters of the optical engine. In the example shown in FIG. 5, because MCU 522 is external to ASIC 502 and analog optical engine 510, MCU 522 is able to use feedback signals from analog optical engine 510 to set parameters of components within line-side DSP 506. For example, MCU 522 can optimize parameters of the equalizers in line-side DSP 506 based on outputs of analog optical engine 510. Similarly, MCU 522 can use feedback signals from line-side DSP 506 to set parameters of the various components within analog optical engine 510. For example, MCU 522 can optimize operating parameters of the modulators, drivers, and TIAs in analog optical engine 510 based on output signals of line-side DSP 506.

Figure 6A:
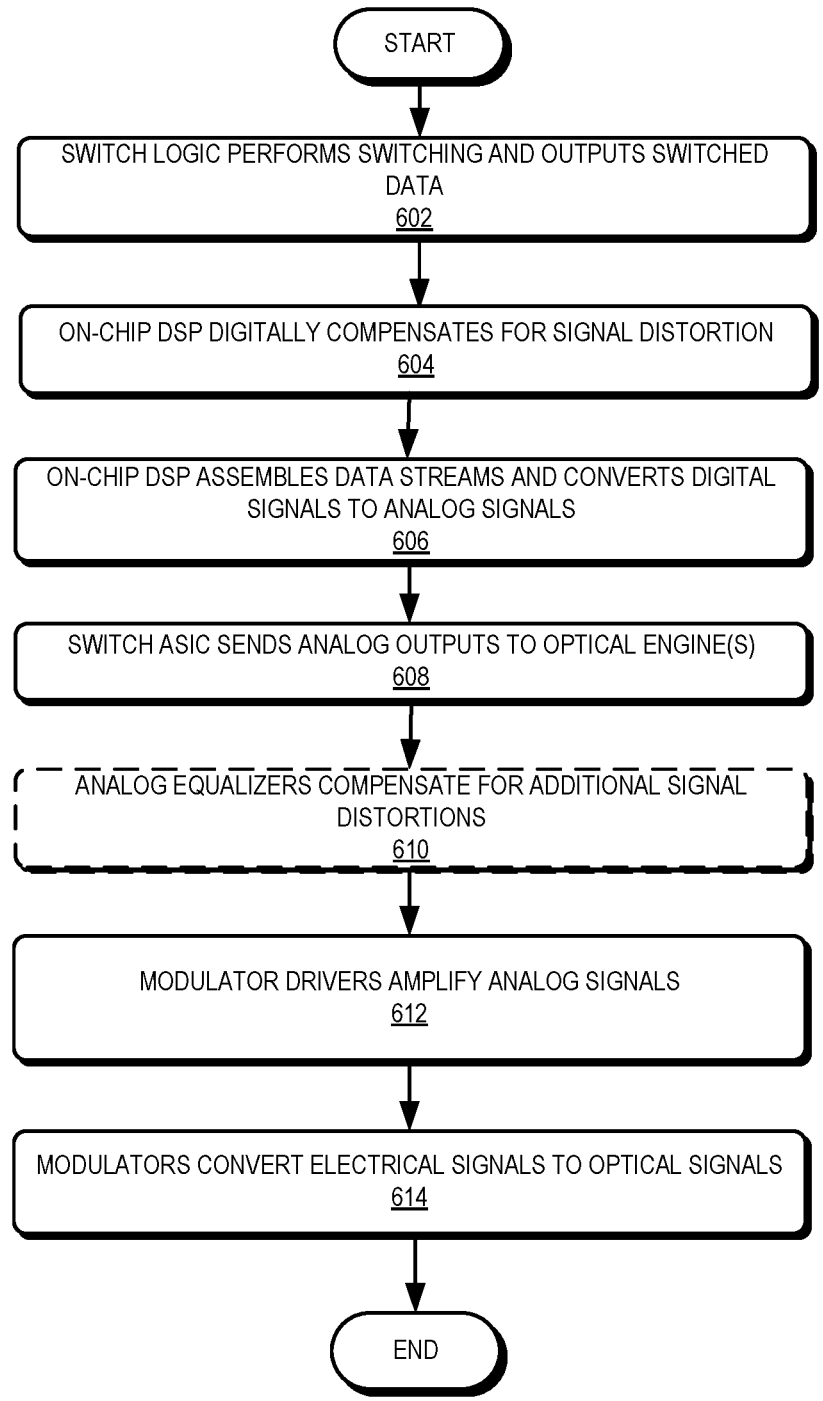
FIG. 6A presents a flowchart illustrating an exemplary process for transmitting data by a CPO-based switch, according to one embodiment.

FIG. 6A presents a flowchart illustrating an exemplary process for transmitting data by a CPO-based switch, according to one embodiment. During operation, the switch logic within the CPO-based switch performs a switching operation and outputs switched data (in the form of electrical signals in the digital domain) to a particular output port (operation 602). The operation of the switch logic is beyond the scope of this disclosure and will not be discussed in detail here. In one embodiment, a particular switch port can correspond to an optical engine. In alternative embodiments, a particular switch port can correspond to a portion of the output channels of an optical engine or multiple optical engines.

The digital signals can then be processed by an on-chip DSP, which is part of the switch ASIC. The on-chip DSP can digitally compensate for the distortion to the switched signals resulting from the channel impairment as well as the impairment of the various components in the optical engine (operation 604). The processed digital signals can also be assembled to an appropriate number of data streams, and each data stream is converted to a corresponding analog signal by the on-chip DSP (operation 606). The number of data streams corresponds to the number of optical channels included in each switch port.

The analog outputs of the switch ASIC can be sent to the corresponding optical engine or engines via high-speed signal traces (operation 608). In some embodiments, the high-speed signal traces can be embedded in the common packaging substrate. At the optical engine, additional distortion in the analog signals can be optionally compensated for by analog equalizers, such as a CTLE (operation 610). Modulator drivers amplify the analog signals (operation 612), and the amplified signals drive the modulators to convert the electrical signals to optical signals outputted by the CPO-switch assembly (operation 614).

Figure 6B:
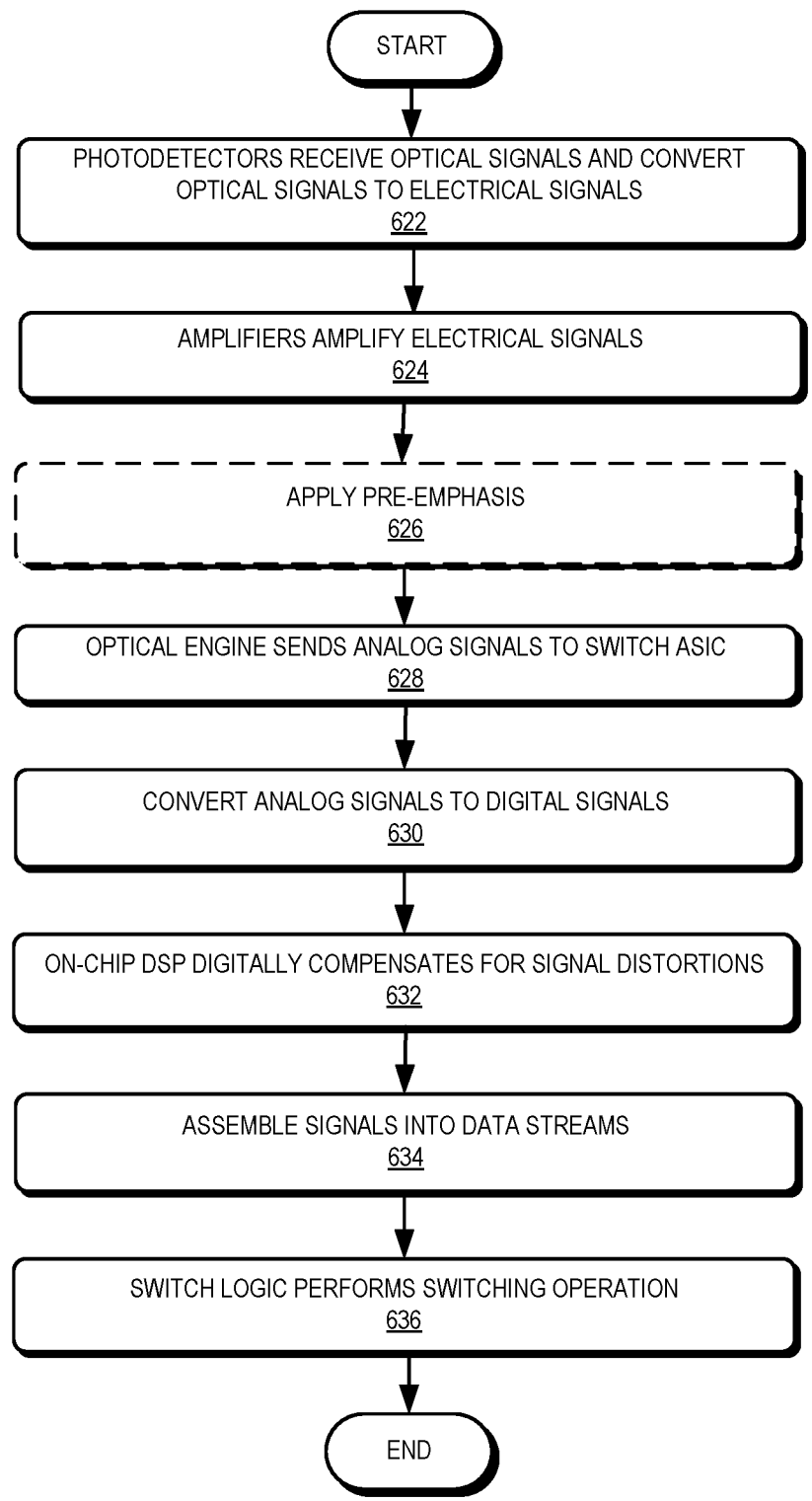
FIG. 6B presents a flowchart illustrating an exemplary process for receiving data by a CPO-based switch, according to one embodiment.

FIG. 6B presents a flowchart illustrating an exemplary process for receiving data by a CPO-based switch, according to one embodiment. During operation, an array of photodetectors corresponding to a particular switch port on the PIC within a particular analog optical engine receives optical signals and converts the received optical signals to electrical signals (operation 622). The electrical signals can be amplified by an array of amplifiers (operation 624). Pre-emphasis can optionally be applied to the amplified analog signals (operation 626) before they are transmitted by the analog optical engine to the switch ASIC via high-speed signal traces (operation 628).

The analog signals can be converted to digital signals to be processed by an on-chip DSP, which is part of the switch ASIC (operation 630). The on-chip DSP can digitally compensate for the distortion to the signals resulting from the channel impairment as well as the impairment of the various components in the optical engine (632). The processed digital signals can also be assembled into an appropriate number of data streams before being sent to the corresponding switch port (operation 634). The switch logic in the switch ASIC then performs the appropriate switching operation (operation 636).

In general, the disclosed embodiments provide a novel solution for implementing CPO technologies in switches. More particularly, by implementing novel analog optical engines in the switches, the proposed solution can significantly reduce the size, cost, and power consumption of the entire CPO switch assembly. One exemplary analog optical engine includes only the optical components (e.g., modulators and photodetectors) and amplifiers (modulator drivers and TIAs). Another exemplary analog optical engine can include analog equalizers (both in the transmitting and receiving directions). Such analog components can often be provided by a single optical device vendor, making it possible for the optical device vendor to independently test and verify the characteristics of the optical engine without the need to include DSPs (which are most likely provided by a different vendor) in the test. On the other hand, the DSPs for signal equalization are now included as part of the switch ASIC. Because signals are compensated on the switch ASIC, there is no longer the need to include the host-side DSP, thus reducing the complexity of power consumption of the DSP used for signal equalization.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments have been presented for purposes of illustration and description only. They are not intended to be exhaustive or to limit the scope of this disclosure to the forms disclosed. Accordingly, many modifications and variations will be apparent to practitioners skilled in the art.

What is claimed is:

1. A co-packaged optics (CPO) switch assembly, comprising:
   a switch integrated circuit (IC) chip and a number of optical modules coupled to the switch IC chip;
   wherein the switch IC chip comprises a switch logic and a digital signal processing (DSP) unit; and
   wherein a respective optical module comprises: a photonic integrated chip (PIC), a first amplifier module, and a second amplifier module;
   wherein the switch IC chip and the optical modules are separate circuit modules co-packaged within a same physical enclosure such that the DSP unit within the switch IC chip and the amplifier modules within the respective optical module are on different chips.

2. The co-packaged optics (CPO) switch assembly of claim 1, further comprising a micro-controller unit (MCU) coupled to the switch IC chip and the optical module, wherein the micro-controller is external to the optical module and is configured to set operating parameters of components within the DSP unit and the optical module.

3. The co-packaged optics (CPO) switch assembly of claim 2, wherein the MCU is configured to:
   optimize operating parameters of a component within the optical module based on output signals of the DSP unit; and
   optimize operating parameters of a component within the DSP unit based on output signals of the optical module.

4. The co-packaged optics (CPO) switch assembly of claim 1, wherein the DSP unit comprises one or more digital equalizers for equalizing signals transmitted to and/or received from the optical module.

5. The co-packaged optics (CPO) switch assembly of claim 4, wherein the digital equalizers comprise one or more of: a feed-forward equalizer (FFE), a decision-feedback equalizer (DFE), a maximum-likelihood sequence estimation (MLSE) equalizer, and a reflection canceller.

6. The co-packaged optics (CPO) switch assembly of claim 1, wherein the optical module further comprises a continuous-time linear equalizer (CTLE) for equalizing an analog signal received by the optical module and/or a pre-emphasis equalizer for equalizing an analog signal transmitted by the optical module.

7. The co-packaged optics (CPO) switch assembly of claim 1, wherein the PIC comprises a set of optical modulators for transmitting optical signals and a set of photodetectors for receiving optical signals.

8. The co-packaged optics (CPO) switch assembly of claim 7, wherein the first amplifier module comprises a set of modulator drivers respectively coupled to the modulators, and wherein the second amplifier module comprises a set of transimpedance amplifiers (TIAs) respectively coupled to the photodetectors.

9. The co-packaged optics (CPO) switch assembly of claim 1, wherein the switch IC chip further comprises a digital-to-analog converter (DAC) configured to convert digital signals outputted by the switch logic to analog domain and an analog-to-digital converter (ADC) configured to convert analog signals received from an optical module to digital domain.

10. A switch integrated circuit (IC) chip to be co-packaged with a plurality of optical modules to form a CPO switch assembly, the switch IC chip comprising:
 a switch logic; and
 a digital signal processing (DSP) unit comprising one or more digital equalizers for equalizing signals transmitted to and/or received from the optical modules;
 wherein the switch IC chip and the optical modules are separate circuit modules co-packaged within a same physical enclosure such that the DSP unit within the switch IC chip and one or more amplifier modules within a respective optical module are on different chips.

11. The switch IC chip of claim 10, wherein the digital equalizers comprise one or more of: a feed-forward equalizer (FFE), a decision-feedback equalizer (DFE), a maximum-likelihood sequence estimation (MLSE) equalizer, and a reflection canceller.

12. The switch IC chip of claim 10, further comprising a digital-to-analog converter (DAC) configured to convert digital signals outputted by the switch logic to analog domain and an analog-to-digital converter (ADC) configured to convert analog signals received from an optical module to digital domain.

13. The switch IC chip of claim 10, wherein the switch IC chip is coupled to a micro-controller unit (MCU) configured to set operating parameters of the digital equalizers.

14. The switch IC chip of claim 13, wherein the MCU is configured to optimize the operating parameters of the digital equalizers based on output signals of the optical modules.

15. An optical module to be co-packaged with a switch integrated circuit (IC) chip to form a CPO switch assembly, the optical module comprising:
 a photonic integrated chip (PIC);
 a first amplifier module; and
 a second amplifier module;
 wherein the optical module and the switch IC chip are separate circuit modules co-packaged within a same physical enclosure such that the first and second amplifier modules within the optical module and a digital signal processing (DSP) unit within the switch IC chip are on different chips.

16. The optical module of claim 15, further comprising a continuous-time linear equalizer (CTLE) for equalizing an analog signal received by the optical module and/or a pre-emphasis equalizer for equalizing an analog signal transmitted by the optical module.

17. The optical module of claim 15, wherein the PIC comprises a set of optical modulators for transmitting optical signals and a set of photodetectors for receiving optical signals.

18. The optical module of claim 17, wherein the first amplifier module comprises a set of modulator drivers respectively coupled to the modulators, and wherein the second amplifier module comprises a set of transimpedance amplifiers (TIAs) respectively coupled to the photodetectors.

19. The optical module of claim 15, wherein the optical module is coupled to a micro-controller unit (MCU) configured to set operating parameters of the amplifiers.

20. The optical module of claim 19, wherein the MCU is configured to optimize the operating parameters of the amplifiers based on output signals of the DSP unit located within the switch IC chip.

* * * * *